United Sta [11] 3,632,188

[72] Inventor Souichi Nakamura
 Kamakura-shi, Japan
[21] Appl. No. 886,128
[22] Filed Dec. 18, 1969
[45] Patented Jan. 4, 1972
[73] Assignee Nippon Kogaku K.K.
 Tokyo, Japan
[32] Priority Dec. 23, 1968
[33] Japan
[31] 43/93732

[54] FIVE COMPONENT ZOOM LENS
 1 Claim, 7 Drawing Figs.
[52] U.S. Cl. ....................................................... 350/186,
 350/214
[51] Int. Cl. ...................................................... G02b 15/14
[50] Field of Search ............................................ 350/184,
 186

[56] References Cited
 UNITED STATES PATENTS
3,363,964 1/1968 Macher ........................ 350/186 X
3,481,666 12/1969 Higuchi ........................ 350/184
 FOREIGN PATENTS
 931,988 7/1963 Great Britain ................ 350/184

Primary Examiner—John K. Corbin
Attorney—Harry G. Shapiro

ABSTRACT: An objective lens comprising a first group consisting of negative and positive components. When focusing is made, the negative component moves toward the object point and simultaneously, the positive component is moved in the same direction with a less amount with the aid of a nonlinear cam. The nearest distance is significantly shortened while the aberrations are excellently corrected without increasing the lens diameter.

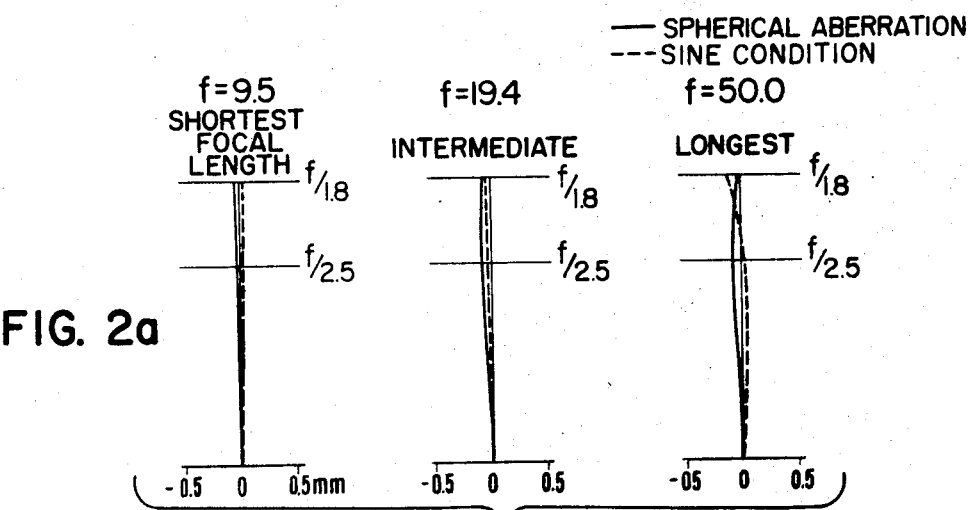
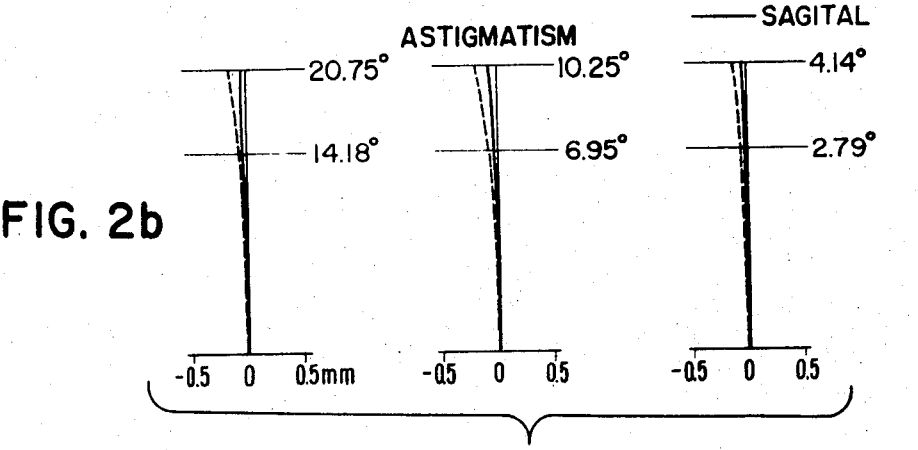
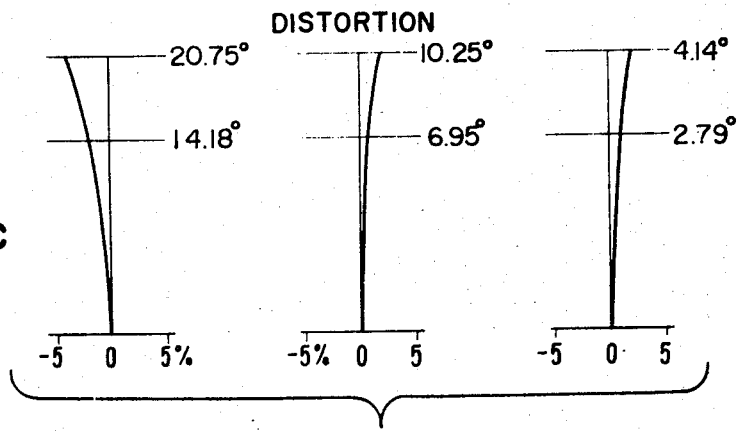

FIVE COMPONENT ZOOM LENS

This invention relates to an objective lens capable of reducing drastically the nearest distance without deteriorating the optical performance at a short distance.

When photographing a near object with a photographic camera, it was usual to attach an auxiliary closeup lens at the front of the lens. However, it is very troublesome to attach such an auxiliary lens, and moreover, several kinds of auxiliary closeup lenses are necessary, since a small range of magnification is covered with one kind of auxiliary closeup lens, so that it is not possible to shorten the nearest distance only with an objective lens itself.

Attempts have hitherto been made to solve said defects. In one of conventional objective lenses, the group for focusing is a group nearest to an object to be photographed, which is called a first group and in general consists of a converging system. For shortening the nearest distance with this system, the shift amount of the first group becomes larger and the lens diameter must be increased significantly. To solve this problem it has been proposed to divide the first group into negative and positive components and to give the first group a positive power as a whole and to move the negative component. With this arrangement, it was possible to shorten the nearest distance without extremely increasing the lens diameter. In this kind of conventional objectives, for reducing the variation in aberrations due to the zooming operation of the negative component, the negative component had to consist of at least two members of three elements and the positive component has also to have a rather complex constitution. However, this approach was not satisfactory in performance.

Accordingly, the object of this invention is to provide an objective having the first group L1 consisting of negative L1-1 and positive L1-2 components in which the negative component is moved simultaneously with the movement of the positive component in the same direction as the negative component but in a lesser amount with the aid of a cam generally of nonlinear shape to prevent the deviation to minus of the image surface curvature and the shortage of correction of the spherical aberration so as to drastically shorten the nearest distance while maintaining the good state of aberration correction.

The present invention will be described more clearly with respect to an illustrative embodiment shown in the drawing, in which:

FIG. 2A–2C are aberration charts for the lens system of FIG. 1 at shortest, medium, and longest focal distance when the object is at infinity.

Figure 1:
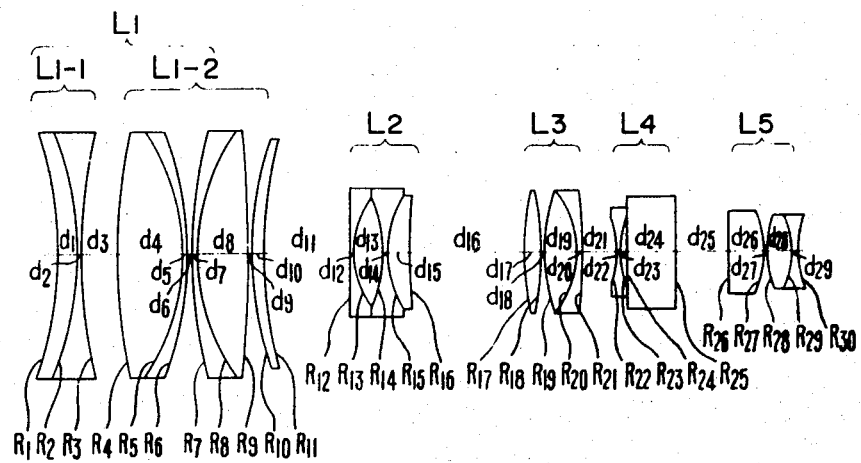
FIG. 1 is a cross section of an embodiment of this invention applied to an 8 mm. cine lens system.

As shown in FIG. 1, according to this invention, the first group L1 consists of a negative component L1-1 and a positive component L1-2 with simple constitution. The negative component L1-1 consists of a doublet, and the positive component L1-2 consists of two doubles and one single lens.

The zoom system L1, L2 and L3 of this objective lens is of the type in which mainly the second group L2 is moved for magnification and simultaneously the third group L3 is moved for maintaining the image surface at a definite position. The first group L1 consists of the negative component L1-1 and the positive component L1-2 and constitutes converging system as a whole. The negative component L1-1 is a negative doublet cementing a positive lens with a negative lens, and the positive component L1-2 consists of two sets of doublets each cementing a positive lens with a negative lens and a positive single lens. Both components L1-1 and L1-2 are moved in focusing, the second group L2 is a diverging lens system consisting of at least two members of three elements, one member of which is an achromat. The third group L3 is a converging system and consists of at least two members of three elements, of which one member is an achromat, and the successive relay system consists of a negative group L4 and a positive group L5. The radii of curvatures R1 and R3 of the front and rear surfaces of the negative doublet constituting the negative component L1-1 of the first group L1, and the radii of curvatures $R_4$, $R_6$ and $R_{10}$, $R_{11}$ of the front and rear surfaces of the front and rear members of a positive component L1-2 satisfy the following conditions:

$$-0.5 < \frac{R_1 + R_3}{R_1 - R_3} < 1.0 \quad (1)$$

$$0 < \frac{R_4 + R_6}{R_4 - R_6} < 1.0 \quad (2)$$

$$-6.0 < \frac{R_{10} + R_{11}}{R_{10} - R_{11}} < -0.5 \quad (3)$$

and, simultaneously, at focusing, the negative component L1-1 of the first group L1 is moved, while for reducing the deviation of various aberrations, the positive component L1-2 is also moved in the same direction as of the negative component L1-1 but smaller amount than that of the negative component.

Next, the significance of the above conditions is explained hereinafter.

However, explanation will be given in such a way that the system will not be formed effectively if the values are out of the ranges specified by the formulas.

The condition (1) is to keep the distortion in good balance over the entire zooming range. When the value of the length side becomes too positive, and when said value is greater than 1.0, the distortion at the minimum focal length side becomes too negative. In either case, the distortion cannot be corrected with the bending of other components.

The condition (2) is for making the entire system compact by reducing the actual distance between the negative component L1-1 and the positive component L1-2 of the first group, especially for making the diameter of the lens smaller. When the value of the fraction is below the lower limit the first principal plane of the positive component L1-2 moves to the front of the positive component L1-2 and the actual distance between the positive component L1-2 and the negative component L1-1 becomes larger. Then the oblique light cannot pass through the lens unless the lens is increased in diameter. This is disadvantageous when taking into account the compactness of the entire system. On the other hand, if the value of the fraction is larger than the upper limit, the first principal plane comes into the inside of the lens component L1-2 and compactness of the system is attained. However, the distortion becomes extremely positive not only at the shortest focal distance but also over the zooming range, and the distortion is hard to correct even with the succeeding relay lens system.

The condition (3) is for balancing the curvature of image surface over the entire zooming range. When the value of the fraction of formula (3) is smaller than the lower limit the curvature of image surface on the long focal length side becomes positive and when the value exceeds the upper limit, the curvature of image surface becomes too negative. In either case, there is no other means to well balance the curvature of image surface.

It is therefore possible to obtain an objective lens system which has excellent performance substantially without the change in aberrations over the range from infinity to near distance by forming the first group with the form that meets the requirement (1) through (3), by shifting the negative component L1-1 of the first lens group when focusing at a near distance and by moving the positive component L1-2 in the same direction as said negative component L1-1 but in smaller amount in order to correct the change in the aberrations, in other words the deviation of the curvature of image surface in the negative direction and insufficient correction of spherical aberration.

This invention will be described more in detail referring to an example.

FIG. 1 is an example of the 8mm. cinephoto zoom lens to which this invention is applied.

The specifications of this lens at aperture ratio f1.8 and focal length $f=9.5\approx50$ mm. are as follows:

| | | | |
|---|---|---|---|
| $R_1=-79.1$ | | | |
| | $d_1=3.9$ | $n_1=1.74077$ | $v_1=27.7$ |
| $R_2=-56.0$ | | | |
| | $d_2=0.8$ | $n_2=1.62041$ | $v_2=60.3$ |
| $R_3=110.61$ | | | |
| | $d_3=6.3$ | | |
| $R_4=131.135$ | | | |
| | $d_4=11.2$ | $n_3=1.5168$ | $v_3=64.2$ |
| $R_5=-40.0$ | | | |
| | $d_5=1.6$ | $n_4=1.69895$ | $v_4=30.0$ |
| $R_6=-59.05$ | | | |
| | $d_6=0.2$ | | |
| $R_7=85.4$ | | | |
| | $d_7=1.4$ | $n_5=1.76182$ | $v_5=26.5$ |
| $R_8=39.5$ | | | |
| | $d_8=9.1$ | $n_6=1.6516$ | $v_6=58.5$ |
| $R_9=-260.753$ | | | |
| | $d_9=0.1$ | | |
| $R_{10}=52.824$ | | | |
| | $d_{10}=3.0$ | $n_7=1.6516$ | $v_7=58.5$ |
| $R_{11}=90.946$ | | | |
| | $d_{11}=1.8144\sim27.8144$ | | |
| $R_{12}=345.3$ | | | |
| | $d_{12}=1.0$ | $n_8=1.717$ | $v_8=48.2$ |
| $R_{13}=16.261$ | | | |
| | $d_{13}=5.4$ | | |
| $R_{14}=-30.253$ | | | |
| | $d_{14}=0.7$ | $n_9=1.5168$ | $v_9=64.2$ |
| $R_{15}=18.2$ | | | |
| | $d_{15}=3.7$ | $n_{10}=1.72825$ | $v_{10}=28.3$ |
| $R_{16}=130.440$ | | | |
| | $d_{16}=39.4096\sim2.0358$ | | |
| $R_{17}=60.0$ | | | |
| | $d_{17}=2.7$ | $n_{11}=1.6583$ | $v_{11}=57.3$ |
| $R_{18}=-51.315$ | | | |
| | $d_{18}=0.1$ | | |
| $R_{19}=33.64$ | | | |
| | $d_{19}=6.3$ | $n_{12}=1.6583$ | $v_{12}=57.3$ |
| $R_{20}=-16.78$ | | | |
| | $d_{20}=0.8$ | $n_{13}=1.72342$ | $v_{13}=38.0$ |
| $R_{21}=-95.933$ | | | |
| | $d_{21}=1.8788\sim13.2526$ | | |
| $R_{22}=-28.8$ | | | |
| | $d_{22}=0.8$ | $n_{14}=1.51454$ | $v_{14}=54.6$ |
| $R_{23}=21.047$ | | | |
| | $d_{23}=1.2$ | | |
| $R_{24}=\infty$ | | | |
| | $d_{24}=9.0$ | $n_{15}=1.57515$ | $v_{15}=41.3$ |
| $R_{25}=\infty$ | | | |
| | $d_{25}=9.8$ | | |
| $R_{26}=148.995$ | | | |
| | $d_{26}=6.9$ | $n_{16}=1.62230$ | $v=53.1$ |
| $R_{27}=-19.704$ | | | |
| | $d_{27}=0.4$ | | |
| $R_{28}=18.9$ | | | |
| | $d_{28}=4.9$ | $n_{17}=1.66755$ | $v_{17}=41.9$ |
| $R_{29}=-14.29$ | | | |
| | $d_{29}=1.2$ | $n_{18}=1.80518$ | $v_{18}=25.5$ |
| $R_{30}=34.322$ | | | | where
R: radius of curvature
d: center thickness of the lens and lens spacing
v: Abbe number of the glass used
n: refractive index of the glass used for d line Let $p$ be the amount of advancement of the negative component L1-1 of the first group for a near distance focusing and $q$ be the correction amount of the positive component L1-2, then the first group is advanced keeping the relationship $$q=0.7596p$$

in the present example.

The prism found in this example and defined by the radii of curvature $R_{24}$ and $R_{25}$ is used to pick up some portion of incoming light for use in the view finder.

FIGS. 2A-2C show each aberration curve for shortest focal length, medium focal length, and longest focal length in case of an object at infinity.

Figure 3A:
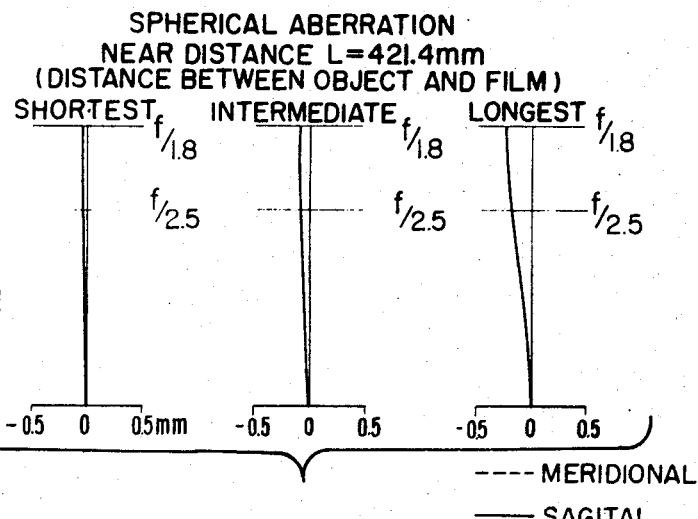
FIG. 3A–3C are aberration charts for the lens system at shortest, medium, and longest focal distances when the object distance from the film plane is 421.4 mm.
Figure 3B:
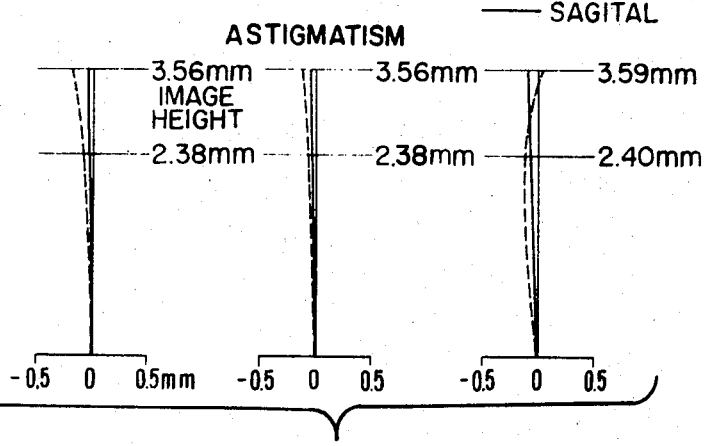
Figure 3C:
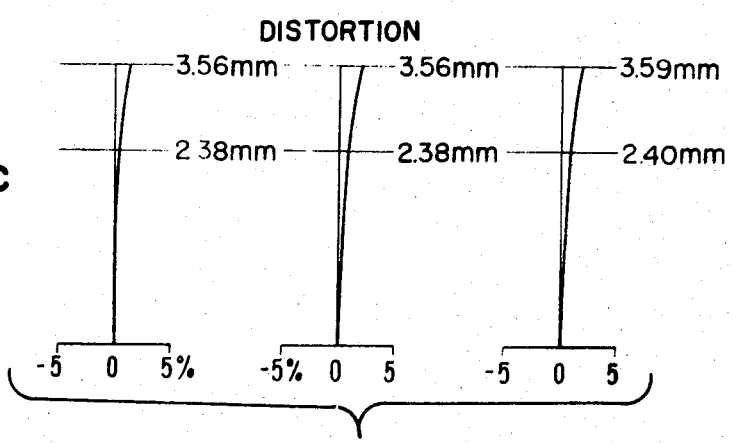

FIGS. 3A-3C show each aberration curve for shortest focal length, medium focal length, and longest focal length in case of an objective at a near distance (421.4 mm. between the film plane and the object). These curves show that corrections of aberrations are excellent from infinity to near distances at each focal length.

As has so far been described, according to this invention, the degradation of image at time of near focusing can be completely prevented and, as a result, the nearest distance of the lens system can be shortened and the advantage of the lens system can be further extended.

What is claimed is:

1. In an objective optical system of the type in which a first group constituting a portion of the objective system, facing an object to be photographed and having a converging performance is moved for focusing, the first group comprising a negative component movable toward the object when focusing from the infinity to a finite distance and a positive component behind the negative component and movable toward the object a smaller amount than the negative component when focusing from the infinity to a finite distance; a zoom system comprising a second negative group behind said first group and stationary when focusing but movable mainly for zooming performance, and a third positive group behind the second negative group and stationary when focusing but movable for maintaining an image point at a definite position; a relay system comprising a fourth negative group behind the zoom system providing a definite position relative to the image point and a fifth positive group behind the fourth group providing a definite position relative to the image point; the system further including a light dividing member behind the zoom system and in the vicinity of the relay system, the light dividing member providing a definite position relative to the image point and leading the light rays incident into the objective to a finder; and wherein the negative component of the first group consists of a doublet member cementing a positive meniscus element concave toward an object point with a negative biconcave element; the positive component of the first group consists of a first doublet member cementing a positive biconvex element with a negative meniscus element concave toward the object point, a second intermediate doublet member cementing a negative meniscus element convex toward the object point with a positive biconvex element and a third single member of a positive meniscus element convex toward the object point; the front member of the second group is a single member of a negative meniscus element convex toward the object point, the rear member of the second group is a doublet member cementing a negative biconcave element with a positive meniscus element convex toward the object point; the front member of the third group is a single member of a positive biconvex element, the rear member of the third group is a doublet member cementing a positive biconvex element with a negative meniscus element concave toward the object point; the fourth group comprises a front member of a single negative biconcave element and the rear light dividing member of parallel plane surfaces; the fifth group comprises the front member of a single positive biconvex element and the rear member of a doublet cementing a positive biconvex element with a negative biconcave element; and the objective optical system has the following data:

aperture ratio $f1.8$ focal length $f=9.5\approx50$mm.

| | | | |
|---|---|---|---|
| $R_1=-79.1$ | | | |
| | $d_1=3.9$ | $n_1=1.74077$ | $v_1=27.7$ |
| $R_2=-56.0$ | | | |
| | $d_2=0.8$ | $n_2=1.62041$ | $v_2=60.3$ |
| $R_3=110.61$ | | | |
| | $d_3=6.3$ | | |
| $R_4=131.135$ | | | |
| | $d_4=11.2$ | $n_3=1.5168$ | $v_3=64.2$ |
| $R_5=-40.0$ | | | |
| | $d_5=1.6$ | $n_4=1.69895$ | $v_4=30.0$ |
| $R_6=-59.05$ | | | |
| | $d_6=0.2$ | | |
| $R_7=85.4$ | | | |
| | $d_7=1.4$ | $n_5=1.76182$ | $v_5=26.5$ |
| $R_8=39.5$ | | | |
| | $d_8=9.1$ | $n_6=1.6516$ | $v_6=58.5$ |
| $R_9=-260.753$ | | | |
| | $d_9=0.1$ | | |

$R_{10}=52.824$
$R_{11}=90.946$
$R_{12}=345.3$
$R_{13}=16.261$
$R_{14}=-30.253$
$R_{15}=18.2$
$R_{16}=130.440$
$R_{17}=60.0$
$R_{18}=-51.315$
$R_{19}=33.64$
$R_{20}=-16.78$
$R_{21}=-95.933$
$R_{22}=-28.8$ $d_{12}=0.8$
$d_{16}=3.0$
$d_{11}=1.8144 \sim 27.8144$
$d_{14}=9.0$
$d_{15}=1.0$
$d_{12}=5.4$
$d_{26}=6.9$
$d_{14}=0.7$
$d_{15}=3.7$
$d_{16}=39.4096 \sim 2.0358$
$d_{22}=1.2$
$d_{17}=2.7$
$d_{18}=0.1$
$d_{19}=6.3$
$d_{20}=0.8$
$d_{21}=1.8788 \sim 13.2526$ $n_{14}=1.51454$
$n_{7}=1.6516$ $n_{16}=1.57515$
$n_{8}=1.717$ $n_{16}=1.62230$
$n_{9}=1.5168$ $n_{16}=1.72825$ $n_{16}=1.80518$
$n_{11}=1.6583$ $n_{12}=1.6583$ $n_{13}=1.72342$ $v_{16}=54.6$
$v_{7}=58.5$ $v_{16}=41.3$
$v_{8}=48.2$ $v_{16}=53.1$
$v_{9}=64.2$ $v_{16}=28.3$ $v_{16}=25.5$
$v_{11}=57.3$ $v_{12}=57.3$ $v_{13}=38.0$ $R_{22}=21.047$
$R_{24}=\infty$
$R_{25}=\infty$
$R_{26}=148.995$
$R_{27}=19.704$
$R_{28}=18.9$
$R_{29}=14.29$
$R_{30}=34.322$ $d_{32}=1.2$ $d_{35}=9.8$ $d_{37}=0.4$
$d28=4.9$ $n=1.66755$  $v_{17}=41.9$ Wherein
$R$ denotes radius of curvature,
$d$- center thickness of the lens and lens spacing,
$v$- Abbe number of the glass used, and
$n$- refractive index of the glass used.

* * * * *

UNITED STATES PATENT OFFICE
CERTIFICATE OF CORRECTION

Patent No. 3,632,188    Dated January 4, 1972

Inventor(s) Souichi Nakamura

It is certified that error appears in the above-identified patent and that said Letters Patent are hereby corrected as shown below:

Column 1, line 48, "FIG." should read --FIGS. --;

line 51, "FIG." should read -- FIGS. --;

line 58, "doubles" should read -- doublets --.

Column 5 should read as follows:

$R_{10} = 52.824$ $d_{10} = 3.0$  $n_7 = 1.6516$  $v_7 = 58.5$ $R_{11} = 90.946$ $d_{11} = 1.8144 \sim 27.8144$ $R_{12} = 345.3$ $d_{12} = 1.0$  $n_8 = 1.717$  $v_8 = 48.2$ $R_{13} = 16.261$ $d_{13} = 5.4$ $R_{14} = -30.253$ $d_{14} = 0.7$  $n_9 = 1.5168$  $v_9 = 64.2$ $R_{15} = 18.2$ $d_{15} = 3.7$  $n_{10} = 1.72825$  $v_{10} = 28.3$ $R_{16} = 130.440$ $d_{16} = 39.4096 \sim 2.0358$

UNITED STATES PATENT OFFICE
CERTIFICATE OF CORRECTION

Patent No. 3,632,188  Dated January 4, 1972

Inventor(s) Souichi Nakamura

It is certified that error appears in the above-identified patent and that said Letters Patent are hereby corrected as shown below:

Column 5 cont'd.

$R_{17} = 60.0$ $d_{17} = 2.7$  $n_{11} = 1.6583$  $v_{11} = 57.3$ $R_{18} = 51.315$ $d_{18} = 0.1$ $R_{19} = 33.64$ $d_{19} = 6.3$  $n_{12} = 1.6583$  $v_{12} = 57.3$ $R_{20} = -16.78$ $d_{20} = 0.8$  $n_{13} = 1.72342$  $v_{13} = 38.0$ $R_{21} = -95.933$ $d_{21} = 1.8788$  13.2526

$R_{22} = -28.8$ $d_{22} = 0.8$  $n_{14} = 1.51454$  $v_{14} = 54.6$

UNITED STATES PATENT OFFICE
CERTIFICATE OF CORRECTION

Patent No. 3,632,188　　　　　　　　Dated January 4, 1972

Inventor(s) Souichi Nakamura

It is certified that error appears in the above-identified patent and that said Letters Patent are hereby corrected as shown below:

Column 6, lines 1-14 should read as follows:

$R_{23} = 21.047$ $d_{23} = 1.2$ $R_{24} = \infty$ $d_{24} = 9.0$　　　$n_{15} = 1.57515$　　　$v_{15} = 41.3$ $R_{25} = \infty$ $d_{25} = 9.8$ $R_{26} = 148.995$ $d_{26} = 6.9$　　　$n_{16} = 1.62230$　　　$v_{16} = 53.1$ $R_{27} = 19.704$ $d_{27} = 0.4$ $R_{28} = 18.9$ $d_{28} = 4.9$　　　$n_{17} = 1.66755$　　　$v_{17} = 41.9$ $R_{29} = 14.29$ $d_{29} = 1.2$　　　$n_{18} = 1.80518$　　　$v_{18} = 25.5$ $R_{30} = 34.322$ Signed and sealed this 6th day of March 1973.

(SEAL)
Attest:

EDWARD M. FLETCHER, JR.　　　　　　ROBERT GOTTSCHALK
Attesting Officer　　　　　　　　　　Commissioner of Patents